Aug. 14, 1962     J. KILBOURNE     3,049,221
SHAFT STRUCTURE
Filed Sept. 11, 1959     2 Sheets-Sheet 1
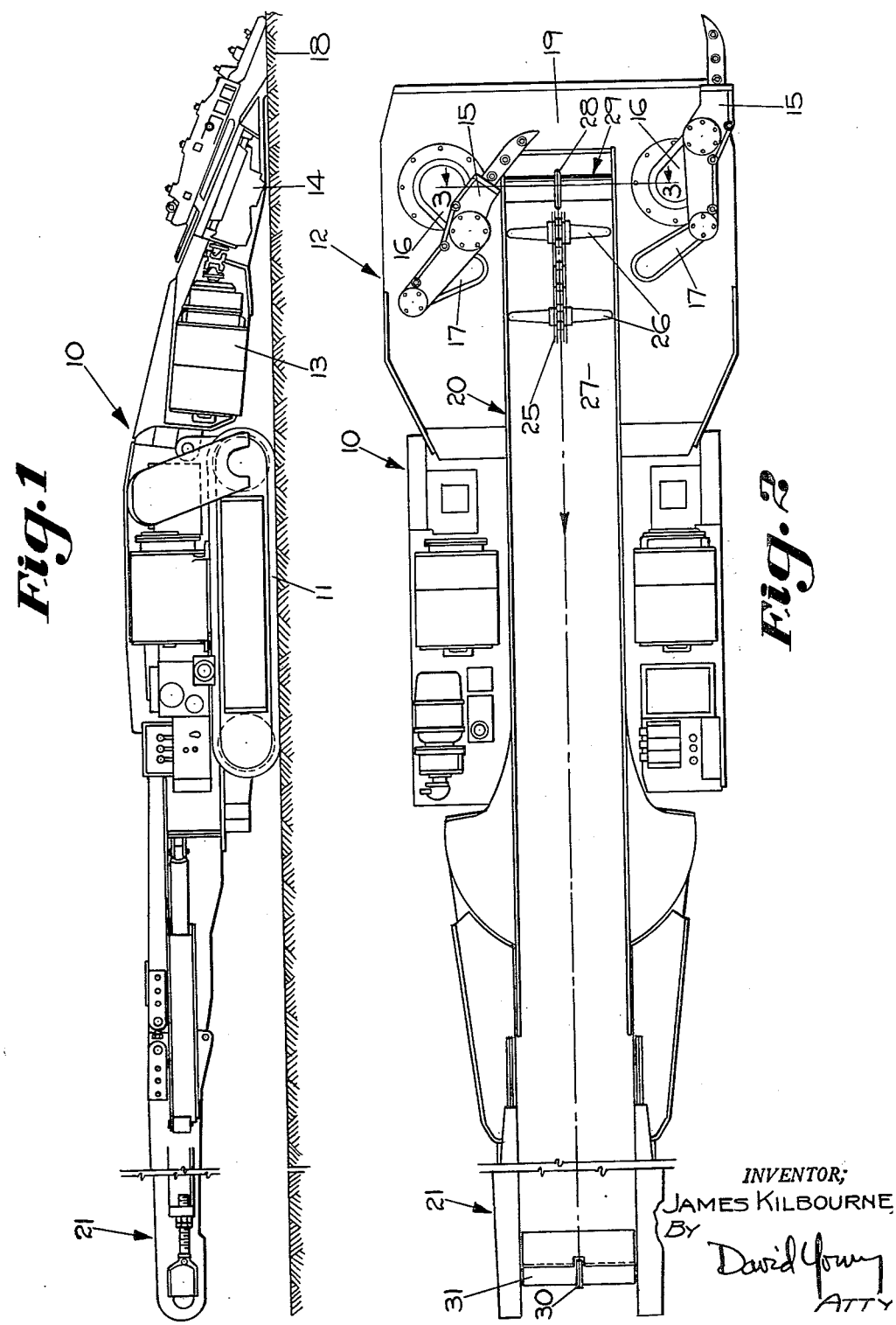
INVENTOR:
JAMES KILBOURNE
BY David Young
ATTY

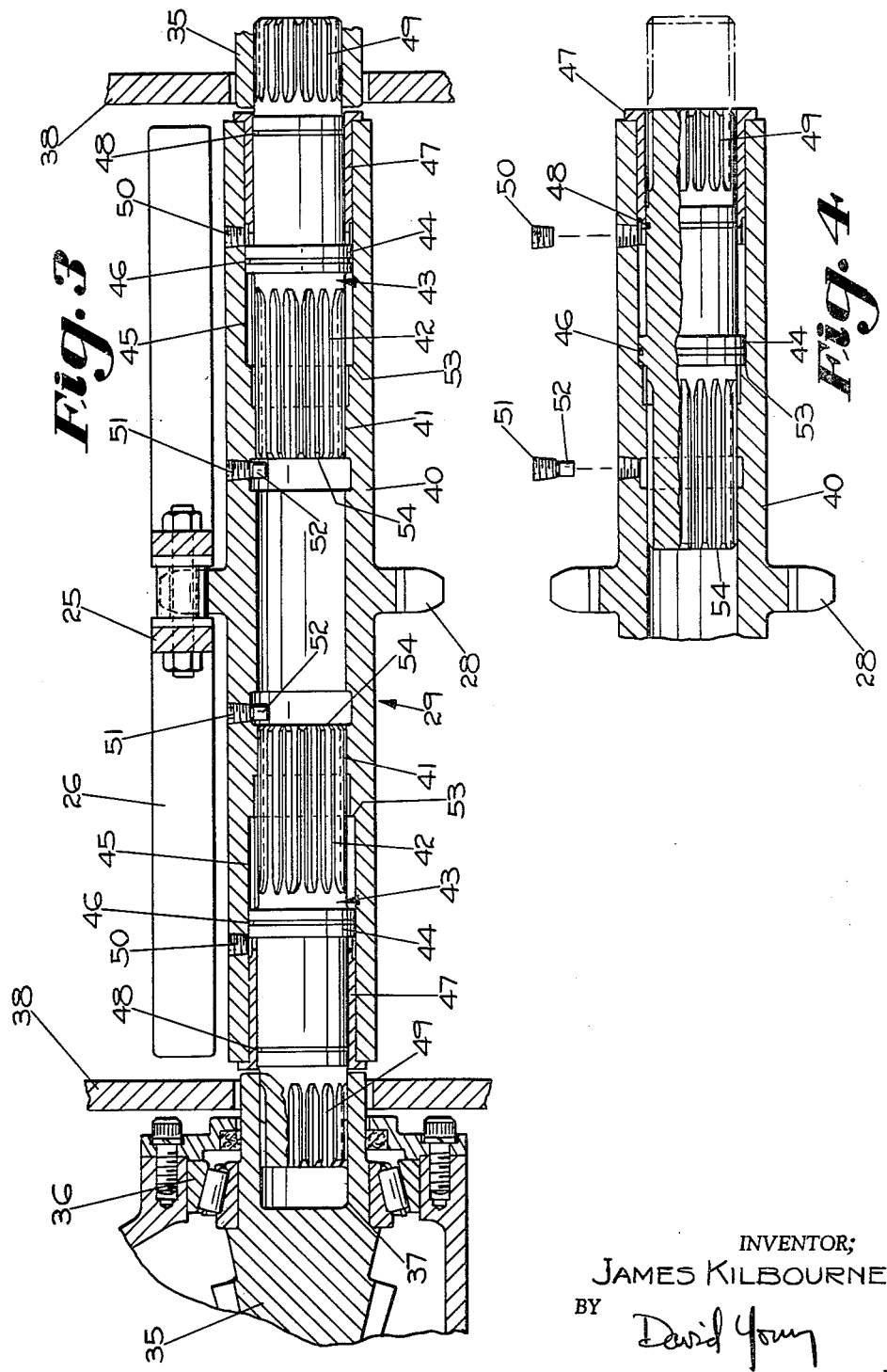

United States Patent Office 3,049,221
Patented Aug. 14, 1962

3,049,221
SHAFT STRUCTURE
James Kilbourne, Columbus, Ohio, assignor, by mesne assignments, to The Jeffrey Galion Manufacturing Company, a corporation of Ohio
Filed Sept. 11, 1959, Ser. No. 839,502
5 Claims. (Cl. 198—203)

The instant invention relates to a shaft structure for a conveyor, in which the shaft structure includes means permitting the shaft structure to be readily disengaged from the supporting and driving means therefor, in order that the shaft structure may be removed without requiring a general disassembly of the apparatus and without requiring removal of any of the elemental parts.

It is an object of the instant invention to provide an improved shaft structure which can be removed from the supporting means therefor, without requiring a general disassembly of the apparatus of which the shaft structure is a part.

It is a further object of the instant invention to provide an improved shaft structure including a main shaft, such as a driven shaft, and a shaft core extending beyond the main shaft in engagement with driving and supporting means for the shaft structure in which the shaft core may be axially moved within the main shaft and thereby withdrawn from the supporting and driving means for removal of the shaft structure and disconnecting the driving connection from the supporting and driving means therefor.

It is another object of the instant invention to provide an improved shaft structure including hydraulic means for disengaging the shaft structure from the supporting and driving means therefor to permit removal of the shaft structure from said supporting and driving means.

It is also an object of the invention to provide improved drive gearing including cooperating rotary driving and driven members and a shaft core or connecting device carried in one of said members and reciprocably slidable along the axis of said one member into and out of radially interlocking driving connection with the other of said members which is supported on appropriate bearing means, whereby when said connecting device is in its engaging relation power may be transmitted from said rotary driving member to said rotary driven member, and in which the one member in which the connecting device is carried not only effectuates the transmission of power between said driving and driven members but also the one member is supported adjacent said connecting device from the supporting bearing of said other member by virtue of said connecting device, and thus said one member may be readily removed when said connecting device is reciprocated inwardly thereof, and in which there is also pressure responsive cylinder and piston means for shifting said connecting device in one or both of opposite directions, thereby to connect or disconnect said driving and driven members.

It is still another object of the instant invention to provide an improved drive shaft for a conveyor in which power is delivered to the opposite ends of the drive shaft, the latter including shaft cores extending beyond the opposite ends of the driven shaft into engagement with drive means for the shaft, and including hydraulic means for withdrawing the shaft cores from engagement with the drive means to permit removal of the drive shaft.

Other objects of the invention will appear hereinafter, the novel features and combinations being set forth in the appended claims.

In the accompanying drawings:
FIG. 1 is a side elevational view of a loading machine embodying the instant invention;
FIG. 2 is a plan view of the loading machine embodying the instant invention;
FIG. 3 is a vertical sectional view of the improved shaft structure taken on the line 3—3 in FIG. 2; and
FIG. 4 is a partial sectional view of the improved shaft structure, with the shaft core withdrawn from engagement with drive means for the shaft structure.

Referring to the drawings, there is illustrated in FIGS. 1 and 2 a loading machine 10 embodying the instant invention. The loading machine 10 is, in effect, a mobile conveyor which includes loading means for loading material onto the conveyor 20 of the loading machine 10. Such apparatus is used particularly in coal mines for the purpose of gathering the coal from the mine floor after it has been removed from the mine face, and conveying the coal to shuttle cars or like apparatus for carrying the coal away from the mine face.

The loading machine 10 is supported at each side thereof on endless crawler traction treads 11 by which the machine is propelled. The forward end of the loading machine 10 has a gathering head 12, which supports an electric motor 13 at each side thereof from which power is supplied to a drive means comprising a gear system 14. At each side of the gathering head 12 there is provided a gathering arm 15 which is driven from a gear system 14 by means of a rotating crank arm 16. The rear end of each gathering arm 15 has connected thereto a swivel arm 17, which is freely pivoted at its opposite ends on the gathering head 12 and on the gathering arm 15 for guiding the motion of the gathering arm 15 into the material on the mine floor 18, and then in a sweeping direction in towards the center of the gathering head 12 to sweep the material up over the apron 19 at the front of the gathering head 12, and onto the conveyor 20 which extends from the gathering head 12 rearwardly along the length of the loading machine 10, terminating in the discharge boom 21 at the rear of the loading machine 10. The conveyor 20 moves the material along the length of the loading machine 10 and discharges the material from the discharge boom 21.

The conveyor 20 comprises an endless chain 25 which extends along the run of the conveyor 20. Along the length of the chain 25, at equally spaced intervals, there are secured a plurality of transversely extending flights 26 which extend to opposite sides of the chain 25 and are driven by the latter along the run of the conveyor 20 to sweep the material over the conveyor bed 27, thereby moving the material to the rear of the loading machine 10 and discharging it from the discharge boom 21. The endless chain 25 is engaged with a sprocket 28 on the tail shaft 29 by which the endless chain 25 is driven. At the end of the discharge boom 21, the endless chain 25 is engaged with a sprocket 30 on the head shaft 31 for guiding the movement of the endless chain 25 at the head end of the conveyor 20.

Each gear system 14 at the opposite sides of the gathering head 12 includes a driven gear 35, disposed on a common laterally extending axis which is coincident with the axis of the tail shaft 29. Each gear 35 is rotatably mounted on a bearing 36, and includes an internally splined drive engaging socket 37 which opens towards the tail shaft 29. The drive engaging sockets 37 of the driven gears 35 extend through the opposite side walls 38 of the gathering head 12, thereby providing access to the drive engaging sockets 37.

As seen in FIG. 3 the sprocket 28 is integrally formed with the main shaft 40 of the tail shaft 29. The tail shaft 29 is symmetrically formed about the sprocket 28, and accordingly, it will suffice to describe merely one end of the tail shaft 29.

The main shaft 40 is hollow and includes an internally splined portion 41, which is complementally formed with the splined end 42 of a shaft core 43. The shaft core 43 is reciprocably received within the main shaft 40 by the interengagement of the splined end 42 of the shaft core 43 and the internally splined portion 41 of the main shaft 40 forming a radially interlocking driving relation between main shaft 40 and shaft core 43 to transmit power therebetween. Beyond the splined end 42, the shaft core 43 is formed with a piston portion 44 which is reciprocably received within a cylinder portion 45 of the main shaft 40. The piston portion 44 includes a piston ring 46 for sealing the area of engagement of the piston portion 44 with the cylinder portion 45. Beyond the cylinder portion 45, the main shaft 40 includes a sleeve 47 fitted into the end of the main shaft 40, and also serving to reciprocably support the shaft core 43 within the main shaft 40. The shaft core 43 is provided with a piston ring 48 for sealing the area of engagement between the shaft core 43 and the sleeve 47. The shaft core 43 further includes a splined end portion 49 which is complementally formed with respect to the internally splined drive engaging socket 37 of the driven gear 35 forming a radially interlocking driving relation between shaft core 43 and gear 35 to transmit power therebetween. The splined end portion 49 extends beyond the main shaft 40 into engagement with the splined socket 37, with power being transmitted to the tail shaft 29 from the driven gear 35 through the shaft core 43 to the main shaft 40.

The main shaft 40 includes a removable pipe plug 50 near each of its opposite ends at a position beyond the piston portion 44 of the shaft core 43, when the latter is in its extended position, as shown in FIG. 3. Inwardly from each of the pipe plugs 50, the main shaft 40 includes a pipe plug 51 at a position beyond the end of each of the shaft cores 43 when they are in extended positions, as shown in FIG. 3. Each of the pipe plugs 51 includes a depending stud 52 secured to the pipe plug 51, as by welding, which extends down below the adjacent periphery of the shaft core 43 locking it against inward movement and in driving relation to the adjacent socket 37. Thus the pipe plug 51 cannot be replaced or threaded into the main shaft 40 until the shaft core 43 is in its fully extended position in which the splined portion 41 thereof clears the depending stud 52.

The tail shaft 29 can be readily removed from the loading machine 10 simply by reciprocation of the shaft cores 43 towards each other within the main shaft 40, thereby withdrawing the shaft cores 43 from engagement with the driven gears 35. In order to withdraw the shaft cores 43, the pipe plugs 50, 51 are removed from the main shaft 40. Suitable pipe connections are then threaded into the main shaft 40 in place of the pipe plugs 50, 51. Hydraulic fluid may then be applied to the piston portion 44 of each of the shaft cores 43 for reciprocating the latter towards each other and removing the splined end portions 49 thereof from engagement with the gears 35. The inward reciprocation of the shaft cores 43 is limited by the abutment of the piston portions 44 thereof against the shoulders 53 in the main shaft 40. The tail shaft 29 may then be lifted out between the side walls 38 of the gathering head 12 for repair or replacement as may be necessary.

The tail shaft 29 is installed by the application of hydraulic fluid under pressure to the end face 54 of the splined end 42 of each shaft core 43. For the purpose of applying hydraulic fluid under pressure to the end faces 54 of the shaft cores 43, the pipe plugs 51 are removed and replaced by suitable fittings for applying the hydraulic fluid. The pressure of the hydraulic fluid acting on the end faces 54 of the shaft cores 43 will force the latter outwardly of the main shaft 40 bringing the splined end portions 49 into engagement with the splined sockets 37 of the gears 35. In the course of reciprocating the shaft cores 43 outwardly of the main shaft 40, the splined end portions 49 are aligned with the splined sockets 37 for engagement of these elements. After the shaft cores 43 have been fully extended, the pipe plugs 50, 51 are replaced in the main shaft 40. If for any reason the shaft cores 43 are not fully extended, the depending studs 52 of the pipe plugs 51 will not clear the end faces 54 of the shaft cores 43, and more pressure will need to be applied to the shaft cores 43 to fully extend the latter. The extensions of the shaft cores 43 is limited by the abutment of the piston portions 44 thereof against the ends of the sleeves 47. In the course of reciprocating the shaft cores 43 in either direction, both of the pipe plugs 50, 51 at the opposite sides of the sprocket 28 are removed to permit any hydraulic fluid contained in the main shaft 40 to be exhausted therefrom, without in any way impeding the movement of the shaft core 43.

The invention has been described herein as applied to the tail shaft of a conveyor which is also the drive shaft therefor. The invention is equally applicable to the head shaft of the conveyor, and may also find other applications. In the loading machine embodying the instant invention there is included a hydraulic system for adjusting certain parts of the machine, such as the gathering head and the discharge boom. This hydraulic system may be utilized as a source of hydraulic fluid under pressure for reciprocating the shaft cores of the tail shaft. In utilizing the instant invention it is also possible to reciprocate the shaft cores by applying pressure to them through the use of a grease gun with appropriate fittings being threaded into the main shaft for this purpose. In accordance with the instant invention there is provided a shaft structure which is drivingly supported at its opposite ends by suitable drive means for supplying power to the shaft, and in which the shaft includes means permitting it to be disengaged from the drive means without requiring a general disassembly thereof, whereby the shaft structure may be readily removed from the apparatus of which the shaft structure is a part.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what is desired to secure by Letters Patent of the United States is:

1. In a conveyor having a driving chain extending along the run of the conveyor, conveying flights secured to the chain and driven thereby to move material along the run of the conveyor, a main shaft including a sprocket engaging the chain for driving the latter, a shaft core in the main shaft, said main shaft including a cylinder portion and said shaft core including an annular piston portion disposed in the cylinder portion for reciprocation relatively thereto, said core shaft including a drive engaging portion extending beyond the main shaft for engagement with drive means and a drive transmitting portion disposed within the main shaft and engaged therewith, said annular piston portion being disposed intermediate the drive engaging portion and the drive transmitting portion of the shaft core, and means for applying hydraulic fluid under pressure to the piston portion to reciprocate the shaft core relatively to the main shaft and to remove the drive engaging portion of the shaft core from engagement with the drive means.

2. In a conveyor having a driving chain extending along the run of the conveyor, material conveying flights secured to the chain and adapted to be driven thereby for moving material along the run of the conveyor, a hollow main shaft including a sprocket engaged with the chain for driving the latter, power means disposed at opposite sides of the conveyor for supplying power to the main shaft through the opposite ends thereof, a shaft core in each end of the hollow main shaft, said main shaft including a cylinder portion for each shaft core, and each shaft core including a piston portion disposed in the respective cylinder portion for reciprocation of the shaft cores relatively to the main shaft, each shaft core including a drive engaging portion extending beyond an end of the main shaft for engagement with one of said power means, means for applying hydraulic fluid under pressure to the piston portions of the shaft cores to reciprocate the shaft cores towards each other and to remove the drive portions thereof from engagement with the drive means, and means for applying hydraulic fluid under pressure into the hollow main shaft to simultaneously apply pressure to the adjacent ends of the shaft cores when they are withdrawn from the power means to simultaneously reciprocate the shaft cores away from each other into engagement with the power means.

3. In a conveyor having conveying means extending along the run of the conveyor and adapted to be driven for moving material along the run of the conveyor, a shaft adapted to be engaged with the conveying means and comprising a main shaft, a shaft core in the main shaft and including shaft portions, one of which extends beyond the main shaft for engagement with supporting means, said main shaft and said shaft core including hydraulic means for withdrawing the shaft core from engagement with the supporting means, said hydraulic means comprising an annular piston disposed intermediate the ends of the shaft core, and means for applying hydraulic fluid under pressure to the annular piston to withdraw the shaft core.

4. In a shaft structure comprising a main shaft, a shaft core in the main shaft and including shaft portions, one of which extends beyond the main shaft for engagement with supporting means, said main shaft and said shaft core including hydraulic means for withdrawing the shaft core from engagement with the supporting means, said hydraulic means comprising an annular piston disposed intermediate the ends of the shaft core, and means for applying hydraulic fluid under pressure to the annular piston to withdraw the shaft core from engagement with the supporting means.

5. Drive gearing comprising cooperating rotary driving and driven members, each of said members having aligned bores, means for selectively connecting and disconnecting said driving and driven members including a connecting device selectively slidable along its axis, said connecting device being slidably carried in the bore of one of said members and having a portion axially slidable into and out of the bore of the other member, bearing means supporting said other member, said one member being supported adjacent said connecting device from said bearing means through said connecting device, said connecting device having power transmitting means on its outer surface adapted to interlock radially with power transmitting means on the interior of the bores of said driving and driven members when it is in a connecting position relative thereto, and pressure responsive means comprising cooperating elements carried by said connecting device and said member which carries it for shifting said connecting device along its axis selectively to a connecting or disconnecting position, said pressure responsive means including a cylinder formed in said one member and a piston attached to said connecting device and reciprocal within said cylinder.

References Cited in the file of this patent
UNITED STATES PATENTS

| | | |
|---|---|---|
| 1,802,708 | Dina | Apr. 28, 1931 |
| 2,493,333 | Baehr | Jan. 3, 1950 |
| 2,671,262 | Kuneholm | Mar. 9, 1954 |
| 2,818,742 | Veach | Jan. 7, 1958 |